Patented Oct. 7, 1930

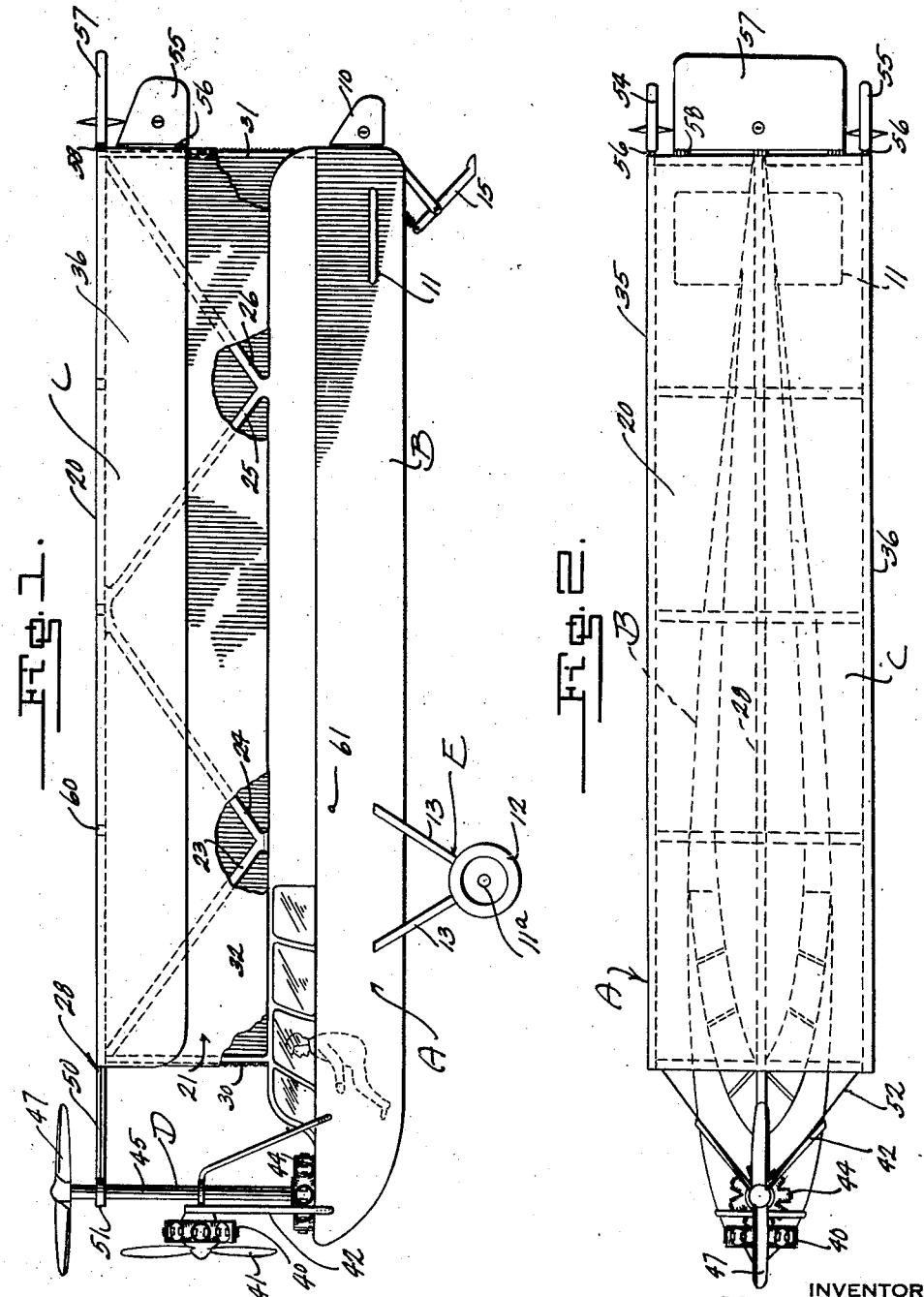

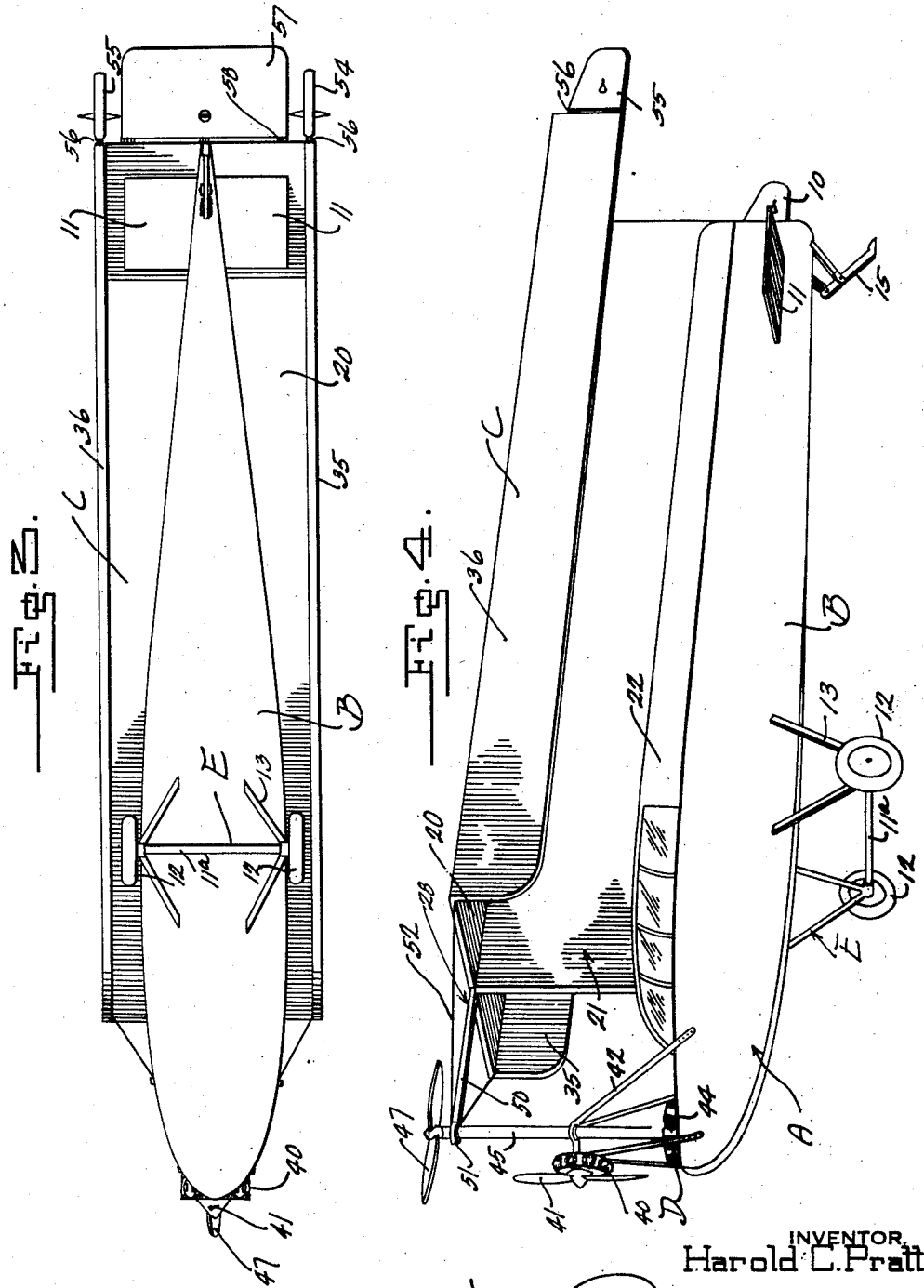

1,777,992

UNITED STATES PATENT OFFICE

HAROLD C. PRATT, OF SWAMPSCOTT, MASSACHUSETTS; DORA COLE PRATT ADMINISTRATRIX OF SAID HAROLD C. PRATT, DECEASED

AIRCRAFT

Application filed March 11, 1929. Serial No. 346,221.

This invention relates to improvements in aircraft.

The primary object of this invention is the provision of an improved heavier than air flying machine, which comprises a construction adaptable for sustained flight by the utilization of comparatively great speeds, in fact so rapid that the air will not have time to be compressed and displaced with respect to the plane or planes.

A further and important object of this invention is the provision of an improved heavier than air flying machine in which the weight of the aircraft is sustained by reactions resulting when one or more flat planes or aerofoils thereof are moved thru the air at a very small angle of incidence, or with practically no angle of incidence, by the application of mechanical power, in such manner that the planes are subjected to a rarefied condition of the atmosphere on the upper surface of the plane and a compressed condition of the atmosphere on the under surface of the plane.

A further and important object of the invention is the provision of a heavier than air flying machine which comprises a novel arrangement of sustaining planes comprising a plane mounted centrally above the fuselage having a relatively long cord and relatively small span; the planes being preferably flat and without camber, and having side flanges to direct the air stream from the propeller in an efficient relation under the short span sustaining planes.

Other objects and advantages of this invention will be apparent during the course of the following detailed description.

In the accompanying drawings, forming a part of this specification, and wherein similar reference characters designate corresponding parts thruout the several views.

Figure 1 is a side elevation of the improved flying machine.

Figure 2 is a plan view of the flying machine.

Figure 3 is a bottom plan view of the flying machine.

Figure 4 is a perspective view of the flying machine.

In the drawings, wherein for the purpose of illustration is shown only a preferred embodiment of the invention, the letter A may generally designate the improved flying machine, which may comprise a fuselage B, sustaining plane means C, propelling means D, and landing gear E.

The fuselage B is of narrow elongated stream line construction, in the form of a boat, and water-proofed so that the machine may alight on the water as well as on the land. It tapers, as shown in Figure 3, from the forward end in a widening relation to a distance about one-third of the length of the fuselage from the front thereof, and therefrom tapers in a convergent relation to the rear end. There is a rudder 10 provided at the rear of the boat-like fuselage, for guiding the craft when traveling in water. Fixed planes 11 are provided at the extreme rear of the fuselage B, at opposite sides thereof, which are preferably flat, to prevent depression of the stern of the craft in the water, and to aid in stability of the craft while flying.

The landing gear E is of conventional construction, and may include an axle $11^a$ to which wheels 12 are rotatably mounted; said axle at the ends adjacent the wheels being connected by V arranged spars 13 with the fuselage B, at approximately the widest portion thereof. A conventional tail skid 15 is placed at the rear under surface of the fuselage.

Referring to the sustaining plane construction C, it is preferred to make the aircraft of the monoplane type. The single plane 20 is flat, and the fore and aft dimension is several times greater than the transverse or beam dimension. It is connected upon its longitudinal central axis by a plane-like spar or supporting structure 21, best shown in Figure 4 of the drawings, at a location above the fuselage, and particularly above the cabinet structure 22 thereof. This supporting structure is shown in detail in Figure 1, and comprises diagonally positioned bracing spars 23, 24, 25 and 26, arranged in a zigzag relation between the longitudinal center line at the top of the fuselage B and the longitudinal axis of the plane 20. The plane 20 has a longitudinal beam 28 connected centrally thereof, to which the upper ends of the said spars 23 to 26 inclusive are connected, in an efficiently braced relation. Vertical upright spars 30 and 31 are provided at the front and rear of the plane 20, being connected at their upper ends to the middle beam 28, and at their lower ends to the top of the fuselage construction, preferably centrally thereof, in any approved relation. All of the spars 23 to 26 inclusive and 30 and 31 are in the same plane, and they are covered by some material 32, such as fabric. This prevents eddies of air current about the spars, and forms a sort of vertical plane to divide the air stream between the portions of the plane 20 at the opposite sides of the supporting structure 21.

For a purpose which will be hereinafter more fully described, the plane 20 at the opposite side longitudinal edges thereof is provided with perpednicular side planes 35 and 36, in right angled relation to the plane 20 and parallel to the construction 21. These side planes are mainly used for directing the flow of air under the plane 20, and to prevent side slip. It is to be noted that the width of the main sustaining plane 20 is not much greater than the maximum width of the fuselage B.

The sustaining plane construction terminates short of the fore end of the fuselage. An engine 40 actuates a vertical propeller 41, which operates as a tractor screw to draw the aeroplane thru the air. The engine 40 is supported by means 42 on the fore part of the fuselage and the slip stream from the propeller is entirely disposed below the plane of the wing 20. A motor 44 of the construction D is provided on the fore part of the fuselage, having a vertically disposed preferably hollow shaft 45, which it operates, and which extends upwardly. It is preferably a six inch hollow duralumin shaft, and has a horizontal propeller 47 at the upper end thereof, at a location immediately above the plane of the wing 20. This shaft 45 is supported at its upper end by means of the forwardly projecting end 50 of the main supporting beam 28 of the wing 20, which has an anti-friction bearing 51 for such support of the shaft. If desired, guy wires 52 may extend from the shaft or the anti-friction bearing 51 to the corners of the wing 20 for reinforcing this structure.

The machine may have a vertical control rudder arrangement, consisting of rudders 54 and 55, which are vertically hinged at 56 to the rear edges of the side wings 35 and 36. If desired, the vertical rudder arrangement may be connected to the spar 21. A horizontal control or elevator 57 is provided, for controlling vertical flight; this elevator 57 being pivoted at 58 to the rear of the plane 20. While no attachment for control of lateral stability has been provided, should it be found desirable to include such feature, they are merely of conventional design and can be added.

It is to be noted that the wing or plane 20 is flat. With such a flat plane, when it reaches zero angle of incidence, the pressure moves off the plane at approximately 25% from the leading edge. Therefore, in this invention such pressure would move off the plane at approximately the location designated at 60 in Figure 1 of the drawings. In order to properly stabilize the craft, the center of gravity of the machine, designated at 61 in Figure 1, is located slightly rearwardly of a perpendicular line dropped from the location 60.

Upon setting the machine in motion along the ground, by means of operation of the propeller 41, the tail part of the machine will be depressed and a center of pressure will develop at a point between 60 and the center of the plane 20. As the speed of the propeller 41 increases, the machine will lift off the ground, but at a great expense of power, due to the excessive amount of drag as compared with a cambered plane. Further increasing the speed of the propeller 41 permits the center of the pressure to be moved forward and the angle of incidence decreases, and also the drag. It follows, that in this type of plane, the lift decreases and the machine begins to descend. With the machine flying and the plane 20 at practically zero angle of incidence, the center of pressure is approximately at the location 60, and the center of gravity therebelow. The machine is now in a condition of inherent stability, because a depression of the tail moves the center of pressure to the rear and sets up a righting couple on the under surface of the plane. A depression of the leading edge correspondingly will move the center of pressure to the rear and set up a righting couple on the top side of the plane. This condition of stable gliding flight would soon bring the machine to the ground, unless a new principle of flight is brought into operation. My claim for a sustained flight by an aeroplane of this type, using flat planes is based on utilization of comparatively great speeds. The above described gliding flight of the machine A, at a certain speed, assumes that the air is constantly displaced. However, as it takes a certain amount of time for the air to be compressed and displaced, it is my proposal that the speed of the aeroplane be increased to such an extent that the plane 20 is constantly entering upon new portions of air and leaving behind the air already travelled over, at a speed so rapid that the air does not have time to be compressed and displaced, and the plane or planes will have no angle of incidence, and no under side pressure or top side suction as has been necessary for sustained flight of aeroplanes heretofore. This will be entirely feasible when high speed engines are developed to the extent possible to bring the use of my construction into practical operation.

With the improvements in construction below described, the aeroplane is capable of heavier loading and flying at less speed. This is so because the motor 44 operates the propeller 47 so as to force the current of air into which the plane 20 is about to pass to a location below the plane 20. Thus, as the aeroplane moves forward the upper surface of the plane 20 enters a portion of the air which has been rarefied by the suction of the propeller 47, and the downward stream of air from the propeller 47 is caught in the slip stream of the propeller 41 and blown backward beneath the plane 21, increasing the density of air under the plane 20. This decrease of density above the plane 20 and increase of density below the plane 20 creates a lift which is obtained without the detrimental drag associated with planes of the cambered type. In this connection the lateral planes 35 and 36 are of great value in directing the air rearwardly beneath the long narrow main plane 20.

The operation of the propeller 47 creates a lifting effect on the forward part of the aeroplane which tends to move the center of gravity towards the rear. This would create an offsetting couple if it were not for the fact that the combined efforts of propellers 41 and 47 move the center of pressure to the rear also. By proper adjustment of the relative speeds of the motors the aviator can control the aeroplane for horizontal flight by bringing the center of pressure and the center of gravity into proper relation, and at the same time maintaining the plane on its flight path with practically no angle of incidence. All this is accomplished without use of the elevator 57. Aeroplanes in common use require adjustment of the elevator and consequent changes in the angle of incidence to compensate for speeds or loadings other than those provided for in the design of the aircraft. These changes create greater drag, which is not the case with my improved aeroplane. However, an elevator 57 is provided for use on the improved aircraft A, because temporary correction of flight path will at times be necessary.

The improved aeroplane A may be manipulated to bank itself on turns without the aid of ailerons, because of centrifugal force acting on the center of gravity in much the same manner that trains suspended by a monorail swing out on curves. The perpendicular side planes 35 and 36 act to prevent side slip in this connection, and further safeguard is enabled by reason of the lateral rudders 54 and 55.

An important feature in the design of any heavier than air craft is the ability of the plane to make a safe landing whether the motors are operating or not. Assuming that motor 44 should cease to function, the operator could of course use motor 40 and the vertical propeller 41. Should motor 40 stop operating, proper regulation of the motor 44 for operation of the propeller 47, and in connection with operation of the elevator 57, will enable a safe landing by means of a slow glide. If both motors cease to function it is noted that the location of the center of gravity 61 and the center of pressure at 60 provides a machine with inherent stability for a safe and rather fast glide to safety.

It is fairly practical to use a longer fuselage for the air craft A, and therewith a series of flat planes in the same line of flight with each other, with the trailing and leading edges of the planes separated by means of a space.

Briefly, from the foregoing it may be seen that the main difference between common heavier than air craft and my invention is the provision of an aircraft which is practical for use with high speed engines, in which the main sustaining wings are not cambered, but are flat and intended to be positioned at no angle of incidence, during flight, to prevent air compression therebelow. However, my improved aircraft is also novel, since it may be used in connection with propeller operation by means of which a rarefied condition is secured above the plane and a compressed condition below the plane in a manner different than anything heretofore provided, to my knowledge. This relationship may or may not be used in connection with a flat wing, such as I provide, but I prefer to use a flat wing, without depending upon any angle of incidence or a cambered surface to secure lift. While a horizontal propeller reduces the weight of the machine, during operation, still it does not come in the helicopter class.

The description and illustrations of the use of one horizontal propeller 47 above the plane of the sustaining wing 20 simplifies the description and designates the principle involved. One propeller such as shown will operate satisfactorily at aeroplane speeds approximating eightly miles per hour. However, for high speeds it is contemplated by me to use two propellers (instead of one) operating from preferably the same engine in a synchronized relation by means of suitable transmission mechanism; one such horizontal propeller being disposed on the starboard side of the craft and having a right hand screw action, and another horizontal propeller being disposed in a synchronizing operation at the port side, and having a left hand screw action. Thus, these two horizontal propellers may balance each other to prevent eccentric flight. They will be disposed opposite each other transversely of the slip.

Various changes in the shape, size, and arrangement of parts may be made to the form of invention herein shown and described, without departing from the spirit of the invention or the scope of the claims.

I claim:

1. A heavier than air craft comprising a fuselage, a single flat sustaining plane extending throughout substantially the entire length of the fuselage and disposed above the fuselage and being relatively narrow and free of horizontal lateral sustaining wings and in which the center of pressure will be at a point approximately one quarter the distance from the leading edge thereof when the plane is at substantially zero angle of incidence, the center of gravity of the craft being disposed below the plane and to the rear of a line perpendicular from a point one-quarter the distance from the leading edge of the plane, and driving means including a propeller carried by the fuselage entirely forwardly of the plane.

2. A heavier than air craft comprising a body having a plane supported thereabove by means of a relatively thin upstanding strut construction supported along the longitudinal center of the fuselage, said strut construction comprising a covered plane, the first mentioned plane construction being slightly wider than the fuselage and extending substantially the entire length of the fuselage, and depending side wings transversely upon and along the side edges of the main plane.

3. A heavier than air craft comprising a body having a plane supported thereabove by means of a relatively thin upstanding strut construction supported along the longitudinal center of the fuselage, said strut construction comprising a covered plane and the first mentioned plane construction being slightly wider than the fuselage and extending substantially the entire length of the fuselage, depending side wings transversely upon and along the side edges of the main plane, rudders hinged on the rear edges of said side wings, and an elevator at the rear edge of the main plane.

HAROLD C. PRATT.